United States Patent [19]
Brown et al.

[11] 3,856,046
[45] Dec. 24, 1974

[54] VALVE
[75] Inventors: Hart Brown, Houston; Howard N. Puckett, Hockley, both of Tex.
[73] Assignee: Tool Instruments Associates Inc., Houston, Tex.
[22] Filed: Oct. 17, 1972
[21] Appl. No.: 298,272

[52] U.S. Cl............................ 137/625.28, 251/61.1
[51] Int. Cl............................................ F16k 31/145
[58] Field of Search..................... 251/5, 61.1, 331; 137/512.15, 599, 625.28, 625.3, 625.33, 625.4

[56] References Cited
UNITED STATES PATENTS

| | | | |
|---|---|---|---|
| 2,519,448 | 8/1950 | Fairchild...................... | 137/625.3 X |
| 2,715,418 | 8/1955 | Van Derbeck................. | 251/61.1 X |
| 2,877,791 | 3/1959 | Rich.............................. | 137/625.33 |
| 2,880,752 | 4/1959 | Kreuttner..................... | 137/625.3 X |
| 3,092,144 | 6/1963 | Green............................ | 137/625.3 |

FOREIGN PATENTS OR APPLICATIONS

| | | | |
|---|---|---|---|
| 34,785 | 8/1905 | Switzerland...................... | 251/61.1 |

Primary Examiner—Henry T. Klinksiek
Attorney, Agent, or Firm—Joe E. Edwards; Jack R. Springgate; M. H. Gay

[57] ABSTRACT

A valve having a body with two ports communicating to the interior of the body where a plurality of valve seats which surround the communication between the two ports through the body are positioned in substantially planar relationship and coact with a diaphragm to control the flow through the valve. This abstract is neither intended to define the invention of the application which, of course, is measured by the claims, nor is it intended to be limiting as to the scope of the invention in any way.

11 Claims, 4 Drawing Figures

3,856,046

VALVE

BACKGROUND OF THE INVENTION

Valves have included various configurations for the use of diaphragm valve member coacting with a valve seat or multiple valve seats. Such valves are generally designed to throttle and thereby control the flow rate by opening partially. Few configurations are ideally suited for service requiring the valve to be either completely open or completely closed.

Such diaphragm valves have particular application for the handling of slurries and other fluid streams including breakable solids, such as ion exchange resins in water. It is of particular importance in handling such streams that the solids do not prevent positive closing and sealing of the valve and that the valve member does not break or otherwise damage the solids.

SUMMARY

The present invention relates to an improved diaphragm valve which is suitable for the handling of fluids with solids entrained therein.

The improved valve of the present invention includes a plurality of valve seats being in a generally planar relationship to each other and a flexible diaphragm mounted to be moved into and from seating engagement with the valve seats to control the flow through the valve.

An object of the present invention is to provide an improved valve suitable for handling a stream with fragile solids entrained therein without breaking the solids or failing to seal on seating because of the presence of solids in the stream.

Another object is to provide an improved diaphragm valve having a long life in terms of numbers of opening and closing cycles.

A further object is to provide an improved diaphragm valve which opens quickly and closes quickly and is suitable for use as a pump intake and discharge valve.

Still another object is to provide an improved diaphragm valve which has a greatly increased life.

These and other objects and advantages are hereinafter more fully set forth and explained.

DESCRIPTION OF THE PREFERRED EMBODIMENTS

Figure 1:
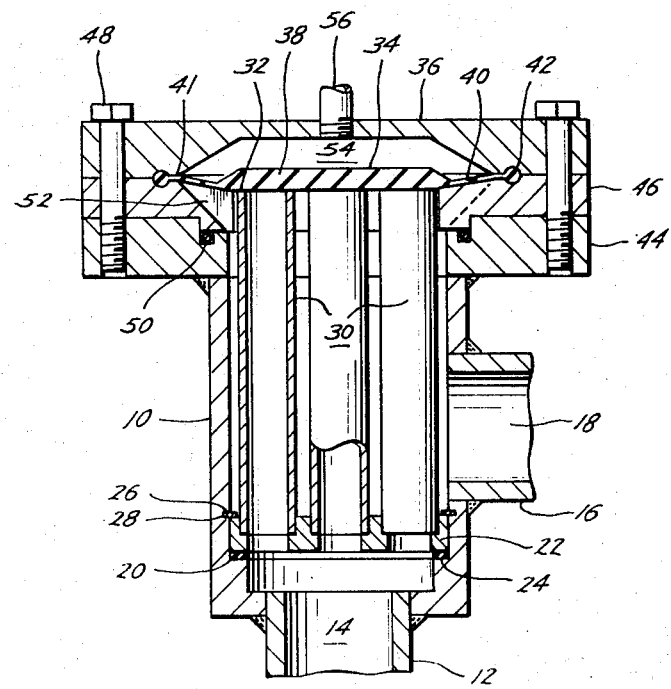
FIG. 1 is a sectional view of the improved diaphragm valve of the present invention showing the diaphragm in seated position.

The improved valve of the present invention includes a tubular body 10 having the pipe 12 connected into the closed end of body 10 to define a first port 14 (normally an inlet) and the pipe 16 connected into the side of body 10 defining the second port 18 (normally an outlet). The interior of body includes a counterbore defining the shoulder 20. This shoulder 20 provides the support for the mounting of the multiple valve seats within the body 10. The plate 22 is secured within the interior of body to separate port 14 from port 18. Seal ring 24 is positioned between plate 22 and the shoulder 20 to assure sealing of plate 22 within body 10. Snap ring 26 which is positioned in groove 28 retains the plate 22 in sealing engagement with seal ring 24. If desired plate 22 may be secured permanently within body 10 by welding or as an integral part of body 10.

Figure 2:
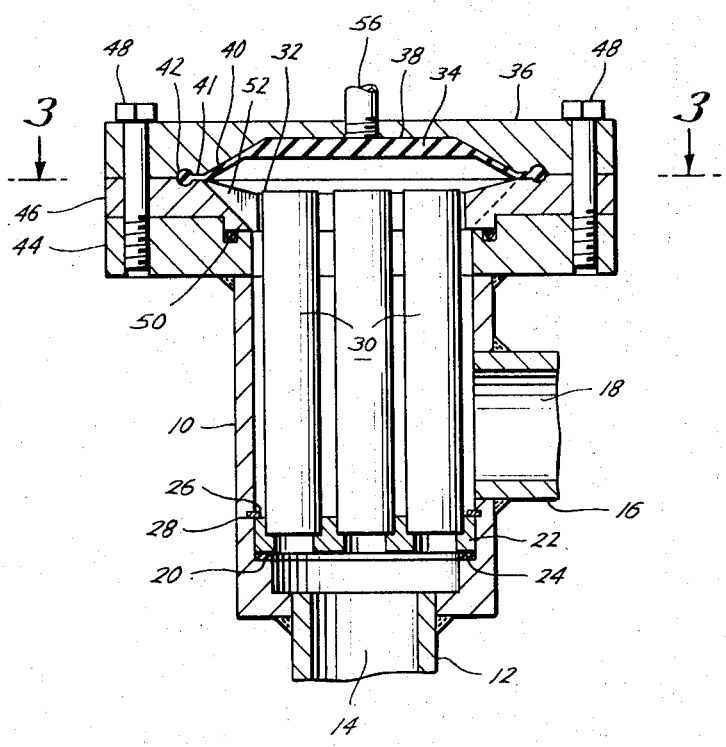
FIG. 2 is a partial sectional view of the valve of FIG. 1 showing the diaphragm away from the seats.
Figure 3:
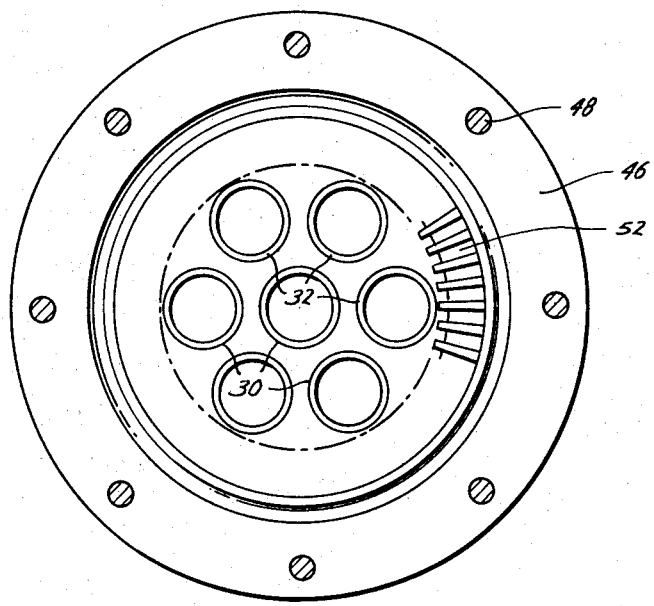
FIG. 3 is a sectional view taken along line 3—3 in FIG. 2 to show the valve seat arrangement and the slotted diaphragm support.

The means defining the valve seats includes the tubes 30 there being at least three preferred; and in the form shown in FIGS. 1, 2 and 3 define seven valve seats 32 at the upper ends of the tubes 30. Such seats 32 are arranged in parallel planar relationship so that a single valving means may easily and readily coact with the seats to open or close flow through the improved valve of the present invention.

When demand is sufficient, a preferred construction uses molded plastic parts cemented or welded together eliminating seal rings 24 and 50, and simplifying fabrication by making tubes 30 integral with plate 22.

The valving means of the present invention includes the diaphragm 34 which is secured to body 10 around its outer periphery by the cover 36. As shown, diaphragm 34 is molded to have a relatively stiff central portion 38, a thin flexible annular portion 40 surrounding said ventral portion 38, the outer annular portion 41 and a seal ring 42 formed integral with said outer annular portion 41. The diaphragm 34 is made from a flexible material having a durometer of less than 55 and preferably about 45.

The stiffness of the central portion 38, which is provided by molding the diaphragm 34 to have a substantially greater thickness than the annular portions 40 and 41 allows the diaphragm 34 to move into sealed seating engagement with the valve seats 32 when subjected to a pressure differential thereacross without excessive sagging between the seats 32. This stiffness assures that the diaphragm 34, when seated on valve seats 32, remains in sealed engagement therewith even when exposed to pressure differential greater than the seating differential and does not wrinkle or otherwise become unseated. Such greater total force differentials occur because the effective pressure areas below the diaphragm reduce when it is seated if the back pressure is decreased. Also it is preferred that said central portion 38 have a thickness in the range from one-third to one-fifth the diameter of the valve seats 32. Such thickness of the central portion 38 of the diaphragm is preferred to be at least three times as thick as the remainder of the diaphragm and may be as much as five times as thick.

The flange 44 is secured to the open end of body 10 as by welding and diaphragm supporting ring 46 is positioned on flange 44 by bolts 48 which secure cover 36 to flange 44. Suitable pressure sealing means such as O-ring 50 is provided between flange 44 and ring 46 and the seal ring 42 of diaphragm 34 is positioned in the grooves in cover 36 and support ring 46. Thus seal ring 42 functions to provide a seal between the cover 32 and the support ring 46 and also retains the outer periphery of diaphragm 34 in its desired position so that it does not slip inwardly or wrinkle.

As shown in FIG. 3 the inner portion of diaphragm support ring 46 defines the vertical slots 52 therethrough. The width of slots 52 should be sufficient to allow the largest of the solid particles to be handled by the valve to pass therethrough to assure that such particles are not trapped by the diaphragm 34 on the support ring 46. The upper surface of support ring 46 is shaped to provide the support for the annular portion 40 of diaphragm 34 in its preferred or natural position when the central portion 38 is in engagement with valve seats 32.

Also the interior of cover 36 is provided with a support shape for diaphragm 34 when it is in its fully opened position. The diaphragm chamber 54 is defined between diaphragm 34 and cover 36 and communication is provided to such chamber 54 by the fitting 56 which is secured in a hole through cover 36.

With this diaphragm construction and support, diaphragm stretching is practically eliminated and the diaphragm is flexed only in the thin flexing portion. Such structure results in a greatly increased useful life of the diaphragm as compared to the diaphragms of the prior art which were required to stretch for sealing and flexing.

Figure 4:
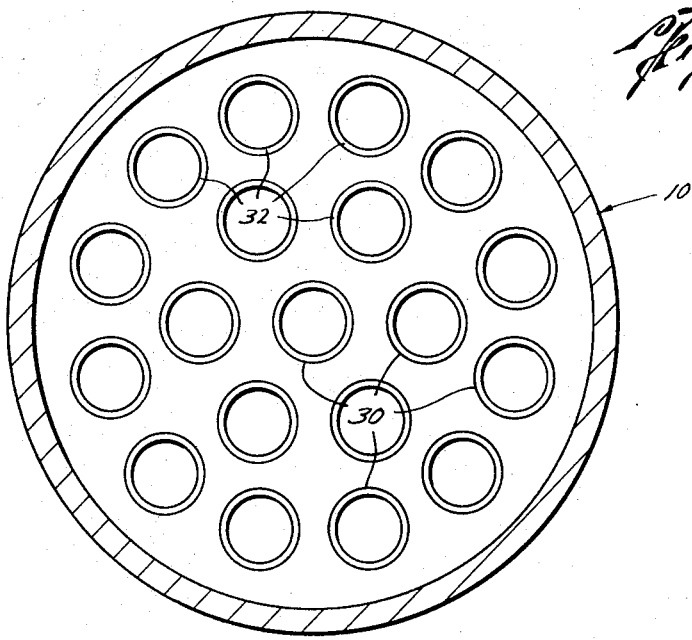
FIG. 4 is another view similar to FIG. 3 but showing a modified form of the present invention with the diaphragm support ring omitted.

As shown in FIG. 4, a very large number of tubes 30 may be included to increase the number of passages and valve seats 32 with which the valving diaphragm coacts. With the multiple valve seats, the amount of lift of the diaphragm 34 for full flow is reduced since the flow area is a function of the seat peripheral length times the diaphragm lift; and the seat peripheral length is increased by having a large number of seats. For example, in the structure illustrated in FIG. 4, 19 tubes 30 of approximately 1-inch diameter have a combined peripheral length approximating 19 pi inches, and provide a total cross-sectional flow area of approximately 14.9 square inches. A 4.36-inch diameter single tube also has 14.9 square inch cross-sectional area, but only 4.36 pi inches peripheral length, which is approximately 24 percent that of the 19 tubes. Therefore the 19 tube construction needs a valve lift of only 24 percent as much as does the equivalent single tube construction. Employing a 4.36 inch ID single tube would also require a much thicker diaphragm to prevent collapsing into the tube or a webb within the tubes to support the seated diaphragm.

One of the advantages of the improved valve of the present invention is that it may utilize the inlet fluid pressure or head to actuate diaphragm 34. This is accomplished by connecting the inlet through a valve (not shown) to the fitting 56. The diaphragm 34 remains on the valve seats 32 as long as the inlet pressure is maintained within the diaphragm chamber 54 and such pressure is greater than the outlet pressure. This results since all of the top side of diaphragm 34 is exposed to inlet pressure and only a portion of the bottom side of diaphragm 34 is exposed to such inlet pressure while the remaining portion is exposed to a lower outlet pressure thereby creating a force differential to maintain the diaphragm in seated position. The diaphragm 34 is readily opened by venting pressure from chamber 54 to allow the pressure beneath the diaphragm 34 to lift it above the valve seats 32.

Another advantageous feature of the improved valve is that it handles slurries and liquids with entrained solids, such as ion exchange resins, without encountering any sealing problems and without damage to the resin particles. The action of the diaphragm 34 in closing on the valve seats 32 tends to wash the seat area free of solids. Also it tends to wash solids through the slots 52 on support ring 46. This action assures proper seating, avoids damage to the solids and the diaphragm due to trapping, and further assures a long operating life for the diaphragm.

As mentioned the specific configuration of the preferred diaphragm assures a resilient but stiff seating by the thick central portion and a long life of repeated flexing of the outer flexible annular portion 40. The ring portion 42 assures that the diaphragm 34 is retained in its proper position and also seals between cover 36 and support ring 46. The proper natural support for the diaphragm 34 when it is exposed to pressure differentials by the cover 36 and support ring 46 further assures a long operating life for the diaphragm 34.

What is claimed is:

1. A valve comprising
a tubular body,
means defining a first port at one end of said body,
means defining a second port extending through said body,
a plate extending across the interior of said body and positioned between said first and second port,
a plurality of tubes extending from and in communication through said plate and in parallel relationship to each other and to the axis of said tubular body with each terminating in a separate annular valve seat,
said valve seats being in substantially the same plane,
a diaphragm mounted to move into and from engagement with said valve seats to close and open flow through said tubes, and
a cover connected to the end of said body opposite said first port,
said cover clamping the outer periphery of said diaphragm to said body,
the center portion of said diaphragm being of substantially greater thickness than the remainder of said diaphragm and of sufficient diameter to engage all of said valve seats.

2. A valve according to claim 1 including
an annular shelf for supporting said diaphragm around said valve seats,
said shelf slotted with slots sufficiently wide to allow solids to settle therethrough.

3. A valve according to claim 1 wherein
said valve seat defining means defines seven valve seats.

4. A valve according to claim 1 wherein said valve seat defining means defines 19 valve seats.

5. A valve according to claim 1 wherein
said diaphragm is of a flexible material having a durometer of less than 55.

6. A valve according to claim 1 wherein
said central portion of said diaphragm is at least three times as thick as the remainder of said diaphragm.

7. A valve according to claim 1 wherein
said central portion of said diaphragm has a thickness from one-third to one-fifth of the internal diameter of said valve seats.

8. A valve according to claim 1, wherein
said diaphragm has a flexible annular portion immediately surrounding said central portion and an enlarged integral seal ring around the outer periphery of said flexible annular poriton.

9. A valve according to calim 1 wherein there are seven of said tubes positioned within said tubular body.

10. A valve according to claim 1 wherein there are 19 of said tubes positioned within said tubular body.

11. A valve according to claim 1 wherein said diaphragm has a flexible annular portion immediately surrounding said central portion whereby said diaphragm may move freely into and from engagement with said valve seats.

* * * * *